3,081,163
TREATING COPPER MATTE
Charles R. Kuzell, Phoenix, Morris G. Fowler, Douglas, Leonard Klein, Scottsdale, and George S. Hawkins, Douglas, Ariz., assignors to Phelps Dodge Corporation, New York, N.Y., a corporation of New York
Filed Mar. 8, 1960, Ser. No. 13,593
8 Claims. (Cl. 75—75)

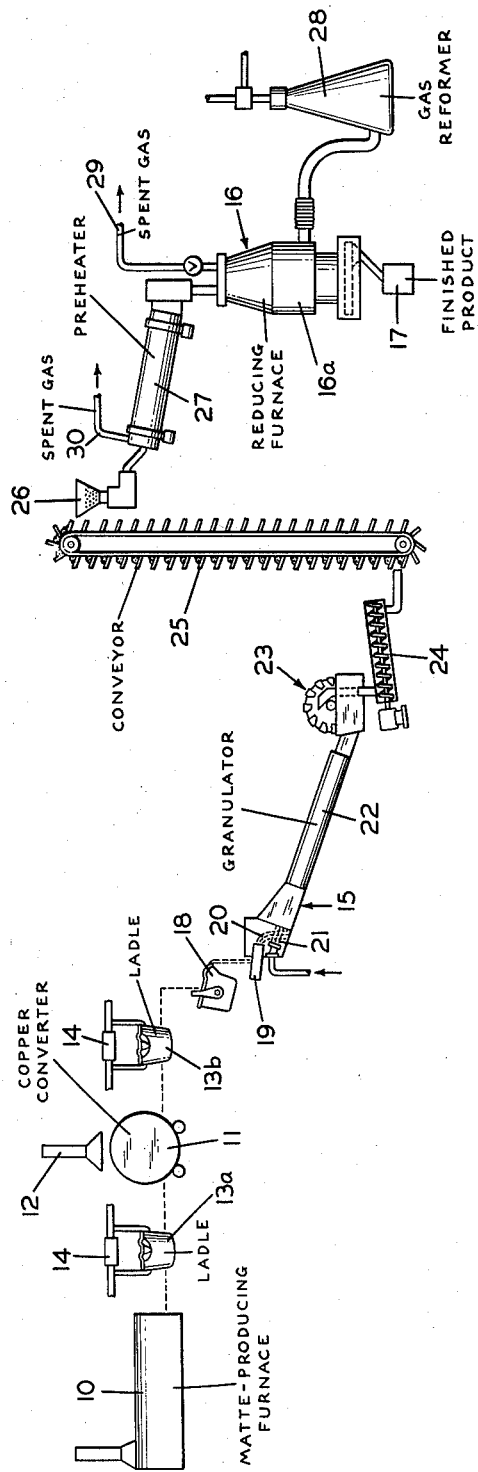

This invention relates to pyrometallurgy and, in general, to recovery of copper and iron from ores or other compositions containing these elements. More particularly, it relates to pyrometallurgical treatment of iron-containing copper matte in a copper converter in which the iron in the matte is separated from the copper in a condition in which it may be subjected to further treatment to recover the iron in metallic form, and the copper is recovered in a form which may, if desired, be subjected to further refining in conventional ways. Most particularly, it relates to the production of an iron source material for the recovery of the metallic iron in the form known as "sponge iron."

For present purposes sponge iron may be considered to be the metallic product resulting from the chemical reduction of iron oxide by reducing agents at temperatures below the fusion point of iron or of any eutectic mixture in impure material containing such iron oxide. The removal of chemically combined oxygen from the lattices of iron oxides accounts for the skeletal form of the final product, which accounts for the name "sponge iron."

In the pyrometallurgical refining of copper ores it has heretofore been common practice to produce a molten copper matte. This is done in a blast furnace, reverberatory furnace or other suitable furnace. In almost all instances the copper matte is converted to copper by a bessemerizing or air-blowing process in a converting vessel. It has been common practice in this air-blowing process to produce a basic silicate slag in which most of the iron collects in the form of the orthosilicate of iron. In accordance with our invention, the copper matte is treated in the converter in a manner different from prior practice and most of the iron is drawn from the converter in oxide form in which it has been rendered suitable for further treatment to recover the iron in metallic state and particularly as sponge iron.

The converter vessels now in most common use for treating copper mate are of the rotating type of cylindrical steel shell lined with a refractory in the form of basic or neutral type brick. That is, a copper converter is conventionally lined with a refractory brick made from a basic or neutral refractory material. There is a variation in size of the copper converters but in current practice, the most widely used and "standard" is a shell thirteen feet in diameter and thirty feet in length, lined with basic type refractory and mounted with its cylindrical axis disposed horizontally. One such converter is well-known in the art as the Peirce-Smith type.

The smelterman's concept of the chemical composition and constitution of copper matte is that of a double sulfide of copper and iron or of the two molten sulfides each mutually soluble in the other in all proportions. Such a general concept needs further detailed discussion for a clearer understanding of our invention. For even though copper matte does consist in the main of the sulfides of copper and iron it also contains significant amounts of oxides of iron. There is a considerable amount of evidence to show that copper matte of any commercial grade (that is, containing sufficient percentage of Cu to make commercial recovery economically feasible) can contain (to the extent of several parts per hundred) magnetic oxide of iron ($Fe_3O_4$) which is usually referred to as "magnetite." This evidence also indicates that the lower grade mattes can contain appreciable amounts of ferrous oxide (FeO) which for convenience of description we have chosen to call or refer to herein by the name "ferra." It is our observation that low grade mattes in the neighborhood of 15% Cu can contain as much as 15% ferra but the amount of it decreases as the grade of matte increases and disappears entirely in the higher grade mattes. It is not uncommon for the oxides of iron present in the matte to be as much as 15% of the total weight of the matte. As an example, the quantitative chemical analysis of a composite sample of mattes from daily production over a five months' period at one copper smelter with which we are familiar showed 27.2% Cu, 41.7% Fe, 25.2% S, which add up to 94.1%. More detailed analysis and calculation revealed the composition to be as follows:

| Ingredient: | Percent of total |
|---|---|
| $Cu_2S$ | 34.0 |
| FeS | 49.6 |
| ZnS | 0.8 |
| $Fe_3O_4$ (magnetite) | 13.2 |
| FeO (ferra) | 1 |
| Miscellaneous minor silicates | 1 |
| | 100 |

It will be seen from the above analysis that about one-quarter of the total iron present in the matte exists as oxide as distinguished from sulfide.

It is well known among smeltermen that the conventional process of converting the matte to copper consists in blowing air through the molten matte to oxidize the sulfur and the iron with the production of enough heat to keep the process going without the addition of fuel. The sulfur is eliminated as sulfur dioxide gas which passes out through the chimney. The iron is oxidized and combines with siliceous flux which has been added to form a basic silicate slag called converter slag which is recycled back to the matte producing furnace for retreatment, cleansing and final disposal as a reverberatory or blast furnace slag of higher silicate degree. This slag is ultimately transported to a dump as waste. Consequently, the iron which was present in the copper ore is not recovered but is ultimately transported to a dump in the form of a higher silicate slag, a state unfavorable for the purpose of recovering the iron or for the production of metallic iron as sponge iron.

In contrast, our process produces a magma in the copper converters in which the iron collects, not as a siliceous slag or silicate of iron, but rather as a combination of iron oxides, primarily in the form of FeO (ferra) and $Fe_3O_4$ (magnetite) which contains only a small amount of silicate but not so much silicate that the magma produced by us in the converter is not amenable to granulation or comminution and further treatment with a reducing gas to produce sponge iron. The magma produced by us is herein called "ferramag" so that it may, for purposes of description, be distinguished from the term "slag" which distinguishes the basic silicate slag produced in a copper converter in conventional practice. According to the most widely accepted concept among smeltermen as to the chemical composition and constitution of converter slag produced in the conventional practice of blowing copper matte in a converter to which has been added a siliceous flux, the principal ingredient in the silicate slag is the orthosilicate (i.e., the monosilicate) of iron which is often referred to by the mineral name "fayalite." The second most important ingredient in the converter slag is magnetite ($Fe_3O_4$) which is considered to be soluble in the fayalite up to a certain point and thereafter to exist as a mush. Conventional converter slag also contains a significant amount of the sulfides of copper and iron and sometimes of zinc in lesser amount. It is believed that the sulfides are partly in solution in this converter slag but also entrained as globules suspended in it. There being an appreciable amount of copper always present in the converter slag, it is recycled to the copper matte producing furnace to make it more siliceous and thus to recover as much as possilbe of the copper sulfide values and then the more siliceous iron-silicate slag is ultimately transported to the dump.

A quantitative analysis of a typical or representative converter slag produced in a commercial conventional converter operation is as follows:

| Item: | Percent of total |
|---|---|
| Cu | 4.76 |
| $SiO_2$ | 20.4 |
| $Al_2O_3$ | 2.5 |
| Fe | 51.1 |
| $Fe_3O_4$ | 28.3 |
| CaO | 0.9 |
| S | 1.81 |
| Zn | 0.5 |

Calculation of these results to fit the above stated concept shows the following composition of such ingredients:

| Ingredient: | Percent total |
|---|---|
| $Cu_2S$ | 6.0 |
| FeS | 0.9 |
| ZnS | 0.8 |
| $Fe_3O_4$ (magnetite) | 28.3 |
| $Fe_2SiO_4$ (fayalite) | 54.7 |
| Miscellaneous alumino-silicates | 9.3 |
| Total | 100.0 |

Inasmuch as the above 28.3% $Fe_3O_4$ contains 20.5% Fe and the 54.7% fayalite contains 30.0% Fe it follows that approximately 40% of the iron content in a conventional converter slag exists as oxide and about 60% as silicate.

It is not feasible to recover the iron as sponge iron from converter slag in which a substantial quantity of siliceous flux has been added to the converter. In tests conducted by us we found that even by using hydrogen, the most powerful reducing agent that could be considered for commercial use, and under temperature conditions that could be considered in commercial apparatus, that only from 40–60% of the total iron in such a conventional converter slag was reduced to iron metal. Apparently only a fraction of the iron in the fayalite was reduced. Because such a process of metallic iron recovery would be so inefficient and the recovered product so low grade, it cannot be considered feasible to produce sponge iron from conventional converter slag. It may be noted here that in the conventional process of converting matte to copper all of the considerable amount of iron that is involved flows through a complete circuit in the sulfide matte from the matte producing furnace to the converter and thence in a silicate converter slag back to the matte producing furnace, ultimately being drawn off from the matte producing furnace and transported to a waste dump. Thus the conventional process is really one of oxidizing and chemically combining the iron so as to dispose of it eventually as a waste product. We have mentioned above that the silicate converter slag is not suitable to be diverted for the production of metallic iron (sponge iron).

In accordance with our invention, no siliceous flux is added to the converter from an external source (except in the unusual case mentioned hereinafter) and the iron in the copper matte is separated in a form that is amenable to treatment for economical production of sponge iron and may be drawn off from the converter as a molten magma and diverted to the production of sponge iron without the necessity of recycling the iron (which exists in combined form) back to the matte producing furnace. Hence, our invention contemplates relieving the smelting plant of the burden of carrying a recycle load of iron in the pyrometallurgical circuit, as has been the practice heretofore.

In our process we treat the copper matte from the matte producing furnace in a converter which may, if desired, be of known and conventional construction. In our process we treat the matte in the converter in such a way and under such conditions that, in lieu of an iron containing slag in which the major portion is fayalite ($Fe_2SiO_4$), as in conventional practice, a magma (herein called ferramag) is produced containing a substantial proportion of oxides of iron consisting mainly of magnetite ($Fe_3O_4$) and ferra (FeO) with a minor amount of hematite ($Fe_2O_3$), the magma also containing a relatively small amount of fayalite and minor amounts of sulfides such as $Cu_2S$ and possibly some Cu present, the fayalite being present in sufficiently small amount as not to interfere unduly with subsequent reduction of the oxides of iron to metallic iron (as sponge iron).

Although our invention contemplates that in some instances it might be desirable in practicing our process to air-blow the copper matte in the converter under conditions such that the iron in the magma would be nearly all magnetite ($Fe_3O_4$), its melting point would be in the neighborhood of 2900° to 3000° F., a temperature seven or eight hundred degrees higher than conventional converter operating temperatures wherein the conventional process of adding a siliceous flux is followed and the converter slag recycled back to the matte producing furnace. Such intensive oxidation in the converter by the air blast would necessitate a non-corrodable lining and an absence of silica or siliceous material. Furthermore, such a magnetite magma is subject to quick mushing or freezing, and also would probably contain more copper. Moreover, such practice would not be possible in the conventional converter apparatus already existent but would require expensive new equipment. Preferably our process of air-blowing the copper matte is carried out at a temperature much lower than 2900° F. so that present conventional existing copper matte converters may be advantageously used.

It is conceivable that by subjecting the $Fe_3O_4$ in the magma in the converter to a fractional reduction either in the same or in a separate vessel, magma predominating in ferra (FeO) would be produced and such reduction might not require so powerful a reducing agent and environment as would the final reduction of FeO to Fe. It will be understood, of course, that it is an important object of the invention to produce an iron-containing magma from iron-containing copper matte which magma provides a source of iron in the form of a product which is amenable to further treatment for the production of sponge iron. The invention also in a broader sense contemplates the production ultimately of sponge iron from iron-containing copper matte or from the copper ore which initially contains iron in quantity sufficient for commercial recovery. And although the fractional reduction of the $Fe_3O_4$ in the magma might be accomplished by blowing through molten magnetite ($Fe_3O_4$) a reducing gas such as certain hydrocarbons, carbon monoxide or hydrogen, the reduction is an endothermic action and it is not practical to operate in this way in the conventional converter apparatus already existent, the main reason being that the melting point of ferra (FeO) appears to be higher than 2500° F. and such endothermic reaction would have to be conducted with the aid of expensive remodeling and additional new equipment in a manner that the temperature of the molten bath would not drop below such melting point of the ferra at the end of the fractional reduction period. The operating temperature would be more than 300° above conventional converting temperature. Hence, such fractional reduction of $Fe_3O_4$ to FeO is not practical in the conventional converting department of a copper smelting plant although it may be recognized that ferra (FeO) might be a more desirable oxide for the production of sponge iron.

We have found that by operating a conventional copper matte converter without addition of siliceous flux and at a temperature of about 2400° F. (which is only about 100 to 200 degrees above the normal or conventional temperature used in air-blowing copper matte in which a siliceous flux is added) that we are able to produce a magma intermediate between ferra (FeO) and magnetite ($Fe_3O_4$) which magma is admirably suited for the production of sponge iron. The molten converter product produced by us in the copper converter which we refer to as an oxide magma (to distinguish it from the conventional copper converter slag which is predominantly a silicate of iron), and which magma is herein called ferramag, is made up predominantly of oxides of iron with a major portion being $Fe_3O_4$ (magnetite) together with a smaller amount of FeO (ferra) and it contains a small amount of $Fe_2SiO_4$ (fayalite) together with lesser amounts of Cu (copper) and $Cu_2S$ (copper sulfide). For example, the ferramag will contain a combined amount of magnetite ($Fe_3O_4$) and ferra (FeO) amounting to at least 50% of the ferramag and said ferramag will contain fayalite ($Fe_2SiO_4$) in an amount not exceeding 25%.

As the chemical analysis set forth hereinafter shows, ferramag like magnetite, and perhaps nearly to the same extent, will divert out of the converting process a small amount of copper so that its production from copper matte in the copper converter as a product for the production of sponge iron will ordinarily be limited to instances in which the presence of small amounts of copper in the sponge iron will not interfere seriously with its subsequent uses. But even with this limitation the field of use of the sponge iron product produced by our process is very extensive, and includes, among others, such uses as a precipitating material and grinding media where the copper content is at some point recycled back into the milling or copper smelting processes.

We have found also that basic magma such as ferramag which may be produced at a temperature only moderately above the temperature of conventional copper converter practice does not corrode the conventional basic lining of the converter and it is practical to transport the molten ferramag in conventional ladles in the smelting plant for subsequent treatment for production of sponge iron.

Referring again to ferramag produced by us as iron-source material for the production of sponge iron, we think that it can be best described briefly as a ternary eutectic of magnetite-ferra-fayalite. However, this may be somewhat oversimplified and we do not wish to be bound by any present theoretical explanation. Suffice it to say that we have successfully produced sponge iron from the ferramag produced by us from iron-containing copper matte as described herein, whatever be the exact theoretical explanation. The ferramag produced by us is predominantly oxides of iron with a relatively small amount of fayalite and a much smaller amount of other minor silicates. In this predominantly iron oxide magma (ferramag) there is dissolved a small amount of copper sulfide and a much smaller amount of iron sulfide. Somewhat larger amounts of these sulfides together with some copper may be entrained as globules in this heavy basic magma.

The following is an example of a quantitative chemical analysis of typical ferramag produced by us after it has been water quenched and granulated to suitable particle sizes for subsequent reduction to sponge iron by a gaseous reducing agent, the example showing also the total iron and iron in elemental form after reduction:

|  | Original Ferramag, percent | Reduced Material, percent |
|---|---|---|
| $Fe_T$* | 65.35 | 84.75 |
| $Fe_m$** | 0.00 | 81.22 |
| $Fe_3O_4$ | 45.79 |  |
| Cu | 4.40 |  |
| $SiO_2$ | 4.64 |  |
| S | 0.83 | 0.13 |
| Zn | 0.48 | 0.13 |
| Ni | 0.14 |  |

*Total iron.
**Iron in elemental form.

The original material was subjected in the laboratory to $H_2$ reduction at 1800° F. to constant weight. The loss in weight was 23.14% of the original weight and was due to oxygen reduction, to Zn volatilization and to elimination of S as $H_2S$.

From the above values, there was derived the following tabulation of calculated components of importance in the original material:

| | Percent |
|---|---|
| $Fe_2O_3$ (hematite) | 8.09 |
| $Fe_3O_4$ (magnetite) | 45.79 |
| FeO (ferra) | 30.42 |
| $Cu_2S$ | 4.12 |
| Cu | 1.11 |
| $Fe_2SiO_4$ (fayalite) | 4.96 |
| $Ni_2SiO_4$ | 0.25 |
| $Zn_2SiO_4$ | 0.82 |
| Miscellaneous silicates and aluminates | 4.44 |
| Fayalite et al. | 10.47 |

The "fayalite et al." portion of the ferramag, although small in amount, appears to be a very important, and in most instances an essential component of the ternary eutectic, permitting the ferramag to be produced and maintained molten at a temperature which is only 100 to 200 degrees above the temperature at which is carried out the conventional standard process of converting copper matte in a converter in which a siliceous flux is added and silicate slag is the product made. Thus, it will be seen that ferramag can be produced as a by-product of the copper matte converter process in a conventional converter in the smelter without increasing the expense in that department which otherwise would result if additional corrosion of the linings were brought about or if additional difficulties were introduced in handling the molten materials. Therefore, from an operating viewpoint the production of the desired by-product ferramag can be dovetailed smoothly into existing smelter operations.

The manner in which the small but desirable amount of fayalite et al. is provided is set forth in further detail hereinafter and it is to be understood that operating details such as amount and quality of molten matte and/or cold reverts, rate of blowing, etc., can be varied over wide ranges without departing from the principles described herein.

Although the novel features which are believed to be characteristic of our invention are pointed out in the annexed claims, the invention itself, as to its objects and advantages, and the manner in which it may be carried out may be better understood by reference to the following more detailed description taken in connection with the accompanying drawing, in which an illustrative flow diagram is shown.

In carrying out our process, we prefer to begin with a "clean" converter; that is, one from which the bulk of the superficial sulfur and silica bearing material, called "muck," has been removed. Ordinarily, after a charge of copper matte has been blown or slightly overblown (to produce a copper product for subsequent further pyrometallurgical treatment) in a copper converter of conventional design lined with magnesite brick or other basic lining, practically all non-adhering muck is removed from the converter and the vessel is said to be "clean." However, it must not be inferred that the lining now approaches the state of pristine chemical purity. With its first normal blow, there began selective impregnation of the new lining with constituents of the matte and flux. The quantitative amount if impregnation and degree of penetration thereof into the lining, increase with the life of the lining. Hence, once a lining has been placed in converting service, it loses its simple ceramic character, chemically speaking, and becomes more and more complex with age and with the augmenting burden of new constituents acquired extrinsically. Furthermore, the lining of a "clean" converter is coated, at least in substantial portion of its area, with fayalite containing material from previous use.

Referring now to the diagram shown in the drawing, and starting with a so-called "clean" converter, two taps of matte from a reverberatory furnace 10 amounting to about 28 to 30 tons and a boat of ferramag reverts (or cold matte in lieu thereof) amounting to about 5 to 6 tons are charged by ladle 13a to a 13' x 30' Peirce-Smith converter 11 having, in the illustrative example, 42 tuyeres, 10 of which are 2" and 32 of which are 1½". The charge is blown for one to one and one-quarter hours while maintaining an air flow of 20,000 or more cu. ft. per minute or until the converter operator (assuming him to be an experienced converter operator) judges the blowing has gone far enough. It may be noted here that no siliceous flux is added to the converter as in the conventional copper converter practice.

If the blowing is overdone, while the sulfur continues to drop, the Cu percent begins to rise after attaining a minimum value. At the same time the temperature of the melt starts to rise. Ferramag begins to freeze and stick to the lining in a manner similar to the slag-lining procedure, well known to a skilled converter operator. The net result is a decreased amount of ferramag available for transfer. When the operator determines that the charge has been blown to the proper endpoint, punching is discontinued, the converter 11 is turned out of the stack 12, the air turned off and the finished charge allowed to settle quietly for several minutes. The ferramag forming an upper layer in the converter is now carefully skimmed into a transfer ladle 13b and transported by crane 14 or other suitable manner to the granulation apparatus 15 where it is quenched and granulated by water jet method as described in the co-pending application for patent of Kuzell et al., Serial No. 13,589, filed March 8, 1960, now Patent No. 3,023,454, or by other suitable comminuting process or is stored temporarily in a holding vessel. Subsequently the granulated ferramag is subjected to a reducing operation in suitable reducing apparatus 16 to reduce the oxides of iron to sponge iron, and preferably, but not necessarily, in apparatus as disclosed in the co-pending application for patent of Kuzell et al., Serial No. 13,592, filed March 8, 1960, now Patent No. 3,051,467. The final sponge iron product is delivered from the reducing chamber 16a into storage containers. As shown, portable storage containers 17 are used. The residual white metal is retained in the converter for subsequent normal converter operations and the copper may be further refined in any desired conventional, or other, manner.

We have observed in commercial size operations conducted by us that as the blowing of the fluxless charge is carried on in the converter, the percentage of S of the magma continued to decrease. The Cu content of the magma drops to a minimum of about 3% and then starts to rise. In the meantime, the $Fe_3O_4$ content brought to the converter in the matte and reverts, continued to increase in quantity. The optimum conditions for the lowest Cu value appear to be:

(a) S content between 1.5% and 2.0%
(b) $Fe_3O_4$ between 38% and 42%

This S content is too high for the most desirable operating conditions in our preferred method of reducing the oxides of iron to sponge iron. We have found that it is preferable that the S content of the granulated ferramag not exceed 0.8%. Consequently, blowing of the matte in the copper converter is continued beyond the minimum Cu content for a short period or until the S content is reduced sufficiently, bearing in mind that on continued blowing the S decreases and Cu increases in the magma as mentioned above.

Following is a list of criteria by which an experienced operator may determine the "endpoint" in blowing matte to ferramag: In our preferred practice during the converter operation the temperature of the molten material as the endpoint approaches, as determined by observation with an optical pyrometer, rises to between 2390° and 2420° F. Of course some variaton in these temperatures is possible because in some instances it may be desirable to operate with less fayalite in the magma in which case more $Fe_3O_4$ would be formed and a higher temperature would be the result.

Punching the tuyeres grows more difficult as the process proceeds and at the endpoint it may be almost impossible for the punchers to keep the air flow up to the desirable 20,000 cu. ft. or more, per minute.

As the iron disappears from the last portions of the matte the converter mouth, in the parlance of the trade, begins to look "greasy" and the layer of material around the inside of the mouth begins to "work." When this condition is reached the charge is within one or two minutes of the desirable end of the blow to ferramag.

If a rod is inserted into a stream of the molten ferramag flowing from the converter spout into a ladle, the incrustation thereon becomes spotted "like a leopard." The greater the number of spots the more nearly the blow approaches the endpoint. If the incrustation on the bar begins to develop "bumps," which are cupriferous, it is an indication that the most desirable endpoint has been passed and the charge has been overblown.

It might be noted here that in the controlled production of ferramag according to our process, each of the three categorical components (ferra, magnetite, fayalite et al.) of the molten magma comes from two separate sources. The major portion of FeO (ferra) and $Fe_3O_4$ (magnetite) is produced by blowing matte and reverts and the minor portion is delivered initially in the matte and reverts. The major portion of the "fayalite et al" is furnished by the fayalite-coated lining and a minor portion by that initially present in the matte and reverts. It is possible to conceive of the situation where, in a comparatively long campaign of a converter which may be used exclusively for the controlled production of ferramag, that the supply of "fayalite et al" from the coating on the converter lining would diminish to such an extent that this source would have to be augmented or even completely replaced by the addition of extraneous siliceous material to make up the deficiency. If desired, this may be easily accomplished by the addition of the necessary amount of converter slag, for example, or of other suitable siliceous flux. The same situation would probably prevail also in a converter with a brand-new lining.

There is shown in the following Table I, chemical analysis of ferramag produced by us in a number of runs by the method described above.

TABLE I

*Analysis of Ferramag from Various Runs*

| Run | Material | Cu | SiO₂ | Al₂O₃ | Fe_T* | Fe₃O₄ | S | CaO |
|---|---|---|---|---|---|---|---|---|
| A | Ferramag | 5.05 | 8.0 | 1.0 | 61.7 | 51.0 | 0.37 | 0.4 |
| B | do | 3.03 | 6.27 | | 63.93 | 32.37 | 1.97 | |
| C | do | 3.24 | 4.87 | | 66.00 | 36.80 | 2.20 | |
| D | do | 5.56 | 7.0 | 0.4 | 62.5 | 46.7 | 0.61 | 0.3 |
| 2 | do | 2.88 | 6.9 | 1.1 | 63.2 | 43.2 | 1.4 | 0.3 |
| 3 | do | 3.77 | 5.1 | 1.2 | 65.0 | 37.4 | 3.4 | tr. |
| 4 | do | 3.45 | 5.2 | 0.8 | 65.0 | 45.8 | 1.1 | 0.3 |
| 5 | do | 4.72 | 5.8 | 1.1 | 63.9 | 53.5 | 0.43 | 0.2 |
| 6 | do | 5.67 | 5.7 | 0.8 | 63.8 | 59.0 | 0.34 | tr. |
| 7 | do | 3.15 | 6.0 | 0.6 | 64.0 | 34.2 | 2.80 | tr. |
| 8 | do | 3.28 | 4.35 | 0.75 | 66.0 | 37.5 | 2.14 | 0.25 |
| 9 | do | 4.00 | 6.4 | 1.1 | 63.7 | 46.8 | 0.62 | 0.2 |
| Average | | 3.98 | 5.93 | 0.74 | 64.06 | 43.69 | 1.45 | |

*NOTE.—Fe_T indicates total iron.

The most desirable compositions for subsequent conversion to sponge iron are the ferramags of runs A, 5, 6 and 9 wherein the sulfur content is lowest and there is a major portion of Fe₃O₄. It has been found that in reducing the ferramag to sponge iron, it is desirable to maintain the sulfur content in the ferramag below 0.8%.

Having produced the ferramag in molten state in the copper converter 11, it may be drawn off into a ladle such as the ladle 13b and may be transported by a crane 14 and then charged into a pivoted holding and pouring ladle 18, all as described in detail in said co-pending application of Kuzell et al., Serial No. 13,589, mentioned above. As described in that application, the molten magma, maintained at a temperature of about 2400° F., may be poured from ladle 18 into a pouring spoon 19 from which it is poured in a sheet-like stream 20 into jets and sprays of water 21. This subdivides the molten magma into droplets which are quickly frozen and then the solid particles are carried down the inclined launder 22 in a stream of water to a separator device 23 where the particles are removed from the water and transported by a conveyor 24 and an elevator 25 to a storage bin 26. As described in further detail in said co-pending application of Kuzell et al., Serial No. 13,592, the granulated ferramag may then be fed from bin 26 in a regulated stream into a rotary drier and preheater 27 from which the charge may be fed into the upper end of a vertically disposed reducing chamber 16a, through which is upwardly passed a reducing gas consisting of reformed natural gas which has been reformed in gas reformer 28; spent gas from the reducing chamber 16a being passed either through vent 29 or through the preheater 27 thence through vent 30. The sponge iron is removed from the bottom of the reducing chamber 16a and collected in the portable containers 17 as finished sponge iron product.

The sponge iron product produced from ferramag produced by us is illustrated in the following Table II which shows a composite analysis of an extended run in which the above described processes of granulation and reduction were followed:

TABLE II

*Comparison of Feed Charge to the Reduction Furnace With Sponge Iron Product Delivered From the Reduction Furnace*

| | Feed to Reducing Column | Sponge Iron From Reducing Column |
|---|---|---|
| Tons | 440.81 | 336.1 |
| Cu percent | 5.64 | 7.27 |
| SiO₂ do | 4.7 | 5.8 |
| Al₂O₃ do | 0.9 | 0.9 |
| Fe (Total) do | 62.59 | 82.11 |
| Fe (Metallic) do | | 75.14 |
| CaO do | 0.1 | 0.1 |
| MgO do | 0.2 | 0.2 |
| S do | 0.42 | 0.50 |
| Zn do | 0.45 | 0.53 |
| O do | 25.9 | 3.9 |

The percentage of reduction of the total Fe exceeded 91%, and the grade of the finished product exceeded 70% metallic iron. The 23.8% decrease in tonnage is due to gaseous reduction.

In experiments to determine the effectiveness of the sponge iron product made from ferramag and produced by the granulation and reduction methods referred to above, it was established that it had a much higher reactivity in precipitating Cu from a copper sulfate solution than the conventional tin can scrap.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of producing white metal and an iron-source material for producing sponge iron from a copper matte containing a major portion of iron and copper in the form of sulfides which comprises air-blowing a molten charge of said matte without the addition of siliceous flux from an extraneous source in a conventionally lined copper converter internally coated with a fayalite-containing coating at a temperature substantially lower than 2900° F. but at a temperature which melts the fayalite and causes a small amount of said fayalite to enter into said molten charge, thereby to produce from said charge a supernatant molten oxide-silicate product and a subnatant molten white metal product, causing said air-blowing to be continued until the sulfur content of the oxide-silicate supernatant molten product of said charge is reduced to below 2% and a major portion, more than 50%, of the iron contained in said charge is converted to oxide form while causing a sufficient amount of fayalite to be present in said oxide-silicate molten product whereby there is produced a ternary eutectic magma of magnetite (Fe₃O₄), ferra (FeO) and fayalite (Fe₂SiO₄) in which more than 50% of the iron is in magnetite (Fe₃O₄) and ferra (FeO) form and an amount not exceeding 25% of the iron is in fayalite (Fe₂SiO₄) form, thereby concurrently producing in said converter a subnantant white metal from said copper matte and a supernatant ternary eutectic magna of magnetite (Fe₃O₄), ferra (FeO) and fayalite (Fe₂SiO₄) suitable as an iron-source material for producing sponge iron.

2. A method of producing an iron-source material for producing sponge iron and white metal from a copper matte containing a major portion of iron and copper in the form of sulfides which comprises air-blowing a molten charge of said matte in a copper converter lined with a refractory lining material selected from the class consisting of basic and neutral refractory materials and internally coated with a fayalite-containing coating, thereby to produce a supernatant layer of oxide-silicate molten product and a subnatant layer of molten white metal product, said air-blowing being conducted at a temperature substantially below 2900° F. but high enough to cause a small amount of said Fayalite to melt and enter into said molten charge, causing said air-blowing to be continued until the sulfur content of said charge is reduced to below 2% and a major amount, more than 50%, of the iron contained in said charge is converted to oxide form while causing a sufficient amount of fayalite to be present in said oxide-silicate molten product whereby there is produced a ternary eutectic of magnetite (Fe₃O₄), ferra (FeO) and fayalite (Fe₂SiO₄) in which more than 50% of the iron is in magnetite (Fe₃O₄) and ferra (FeO) form and less than 10% of the iron is in fayalite (Fe₂SiO₄) form, thereby concurrently producing white metal from said copper matte and a ternary eutectic product comprising magnetite (Fe₃O₄), ferra (FeO) and fayalite (Fe₂SiO₄) suitable as an iron-source material for producing sponge iron.

3. A method of producing white metal and an iron-source material for producing sponge iron from a copper matte containing a major portion of iron and copper in the form of sulfides which comprises air-blowing a molten charge of said matte without the addition of siliceous flux from an extraneous source in a basic lined copper converter internally coated with a fayalite-containing coating, said air-blowing being conducted in a manner to cause the charge to have a temperature about 2400° F. so that fayalite enters into said molten charge from said coating, whereby there is produced a supernatant layer of oxide-silicate molten product and a subnatant layer of molten white metal, causing said air-blowing to be continued until the sulfur content of said supernatant layer of oxide-silicate molten product is reduced to below 1% and more than 50% of the iron contained in said charge is converted to oxide form while causing a sufficient amount of fayalite to be present in said supernatant molten product so that there is thereby produced a ternary eutectic magma of magnetite ($Fe_3O_4$), ferra (FeO) and fayalite ($Fe_2SiO_4$) in which more than 50% of the iron is in magnetite ($Fe_3O_4$) and ferra (FeO) form and less than 10% of the iron is in fayalite ($Fe_2SiO_4$) form, thereby concurrently producing from said copper matte white metal and a ternary eutectic product comprising magnetite ($Fe_3O_4$), ferra (FeO), and fayalite ($Fe_2SiO_4$) suitable as an iron-source material for producing sponge iron.

4. A method of producing sponge iron from copper ore containing iron and sulfur compounds which comprises smelting said ore to produce a molten copper matte containing copper and iron in the form of sulfides, blowing a charge of said molten matte with air in a previously used copper converter lined with a refractory lining material selected from the class consisting of basic and neutral refractory materials which converter lining is coated with a coating of fayalite-containing slag, but without adding a significant amount of siliceous flux to said charge from an extraneous source, said blowing being conducted while maintaining said molten charge at a temperature above 2300° and substantially below 2900° F. thereby by said blowing to form white metal and a ternary eutectic magma comprising magnetite ($Fe_3O_4$), ferra (FeO) and fayalite ($Fe_2SiO_4$) and continuing said air-blowing until the sulfur content of said magma is reduced to below 2% and a sufficient amount of fayalite ($Fe_2SiO_4$) is present in said magma to form the hereinafter mentioned ternary eutectic, thereby forming white metal and a ternary eutectic ferramag comprising magnetite ($Fe_3O_4$), ferra (FeO), and fayalite ($Fe_2SiO_4$) in which more than fifty percent of the iron in said ferramag is in magnetite ($Fe_3O_4$) and ferra (FeO) form and substantially less than twenty-five percent is in fayalite ($Fe_2SiO_4$) form, removing said ferramag from said converter, then treating said ferramag to produce a comminuted iron-containing source material and then producing sponge iron from said comminuted iron source material by gaseous reduction.

5. A method according to claim 4 in which the temperature of said charge during the said air-blowing is not permitted to rise to a temperature higher than about 2420° and said air-blowing is continued for a time sufficient to reduce the sulfur content of said ferramag to below 2% and the amount of iron in fayalite form in said ferramag is less than 10%.

6. A method according to claim 5 in which the sulfur content of said ferramag in said converter is reduced to about .8%.

7. A method of producing from molten copper matte, containing copper, iron and sulfur in combined forms, a magma in the form of a ternary eutectic amenable to comminution and subsequent treatment with a gaseous reductant to produce sponge iron which method comprises introducing a charge of said molten copper matte into a previously used copper converter lined with a refractory lining material selected from the class consisting of basic and neutral refractory materials and which is coated with a coating of fayalite-containing slag, blowing said charge, without the addition of siliceous flux from an extraneous source, in said converter while maintaining said charge molten and at a temperature above 2300° F. but not substantially higher than 2420° F., thereby to form an iron-containing magma suitable for producing sponge iron and a white metal product from which the copper may be recovered, continuing said air-blowing for a sufficient time to convert the major portion of the combined iron in said charge to a ternary eutectic ferramag comprising magnetite ($Fe_3O_4$), ferra (FeO) and fayalite ($Fe_2SiO_4$) in which more than fifty percent of the iron is in the form of magnetite ($Fe_3O_4$) and ferra (FeO) and a significant amount but less than 10 percent of the iron is in the form of fayalite ($Fe_2SiO_4$) and in which the sulfur content is substantially less than two percent, then separating and removing the ferramag from the white metal product in said converter.

8. A method according to claim 7 in which said temperature of said charge at the end point of said air-blowing is between about 2390° and about 2420° F. and the sulfur content of said ferramag is reduced to below 1%.

References Cited in the file of this patent

UNITED STATES PATENTS

| 234,212 | Motay | Nov. 9, 1880 |
| 692,310 | Knox | Feb. 4, 1902 |
| 1,453,993 | Payton | May 1, 1923 |
| 1,976,735 | Kuzell | Oct. 16, 1934 |

FOREIGN PATENTS

| 577,456 | Canada | June 9, 1959 |